United States Patent
Hong

(10) Patent No.: US 6,675,700 B2
(45) Date of Patent: Jan. 13, 2004

(54) ELECTRIC TOASTER HAVING MOVABLE HEATING ELEMENTS

(76) Inventor: Tian Tan Hong, 12A03#, No. 4 Bldg., Sunshine Garden No. 1 Shixia North St., Futian District, Shenzhen (CN)

( * ) Notice: Subject to any disclaimer, the term of this patent is extended or adjusted under 35 U.S.C. 154(b) by 0 days.

(21) Appl. No.: 10/320,741

(22) Filed: Dec. 17, 2002

(65) Prior Publication Data

US 2003/0159594 A1 Aug. 28, 2003

(30) Foreign Application Priority Data

Dec. 25, 2001 (CN) .......................................... 01 2 71453

(51) Int. Cl.⁷ ................................................ A47J 37/08
(52) U.S. Cl. ................... 99/329 P; 99/331; 99/385; 99/389; 99/390; 99/391; 219/492; 219/521
(58) Field of Search .................. 99/326–331, 339, 99/340, 385–391, 393, 400, 401, 447; 219/385–387, 391–393, 520, 521, 492, 494, 497; 392/433, 373, 375, 337, 407; 426/241, 243, 466, 523

(56) References Cited

U.S. PATENT DOCUMENTS

| | | | | |
|---|---|---|---|---|
| 5,121,678 A | * | 6/1992 | Del Fresno | 99/391 |
| 5,181,455 A | * | 1/1993 | Masel et al. | 99/391 |
| 5,653,158 A | * | 1/1993 | Balandier et al. | 99/327 |
| 5,664,483 A | * | 9/1997 | Yip | 99/391 |
| 5,802,957 A | * | 9/1998 | Wanat et al. | 99/327 |
| 6,105,486 A | * | 8/2000 | Belknap et al. | 99/389 |
| 6,123,012 A | * | 9/2000 | Hardin et al. | 99/326 |
| 6,267,044 B1 | * | 7/2001 | Friel, Sr. | 99/327 |
| 6,343,543 B1 | * | 2/2002 | Belknap et al. | 99/389 |
| 6,382,084 B2 | * | 5/2002 | Chan et al. | 99/327 |

* cited by examiner

Primary Examiner—Timothy F. Simone
(74) Attorney, Agent, or Firm—Leydig, Voit & Mayer, Ltd.

(57) ABSTRACT

A toaster has a chassis, a pair of end plates, a frame positioned in between and supported by the end plates. There is a pair of heating elements supported by the frame and a receiving bay between the frames. A carriage is movable within the receiving bay between a receiving/dispensing position and a cooking position. The carriage interacts with the frame during movement to transfer the frame and thereby re-size the receiving bay. As a result, the heating elements move closer to the bread during toasting and more away from the toast when toast has completed.

10 Claims, 3 Drawing Sheets

ELECTRIC TOASTER HAVING MOVABLE HEATING ELEMENTS

BACKGROUND OF THE INVENTION

The present invention relates to electric toasters, grillers and the like. More particularly, although not exclusively, the invention relates to a toaster or griller having a vertical bay with a horizontally movable griller at either side thereof.

Standard toasters have one or more bread-receiving bays, at either side of which there is an electric resistance heating element in a fixed location. When bread is inserted into a bay for toasting, it might naturally lean to one side or the other or curl, in which case one side would be closer to a heating element than the other. This might result in insufficient toasting to one side of the bread, and burning to the other in extreme cases.

A further disadvantage of known toasters and grillers is that the heating elements are spaced away from the bread or other food item by a distance suitable for cooking a maximally thick food item. When thin bread or bread of average thickness is inserted into the receiving bay, the gap between the heating elements and the bread means that the bread must be left in the toaster for a longer period than would otherwise be necessary, had the heating elements been closer thereto. This represents an inefficient use of energy.

Furthermore, known toasters have no means of keeping bread of various thickness (typically from 8 mm to 36 mm) flat, preventing the bread from curling while toasting.

OBJECTS OF THE INVENTION

It is an object of the present invention to overcome or substantially ameliorate at least one of the above disadvantages and/or more generally to provide improved energy efficiency in a toaster or griller or like cooking appliance.

It is a further object of the present invention to provide a toaster that can produce flat toast from bread of different thickness.

DISCLOSURE OF THE INTENTION

There is disclosed herein a cooking appliances comprising:
a chassis,
a pair of end plates,
a frame positioned in between and supported by the end plates,
a heating element supported by the frame,
a receiving bay adjacent the frame, and
a carriage movable within the receiving bay between a receiving/dispensing position and a cooking position, the carriage interacting with the frame during said movement to transfer the frame and thereby re-locate the heating element with respect to the receiving bay.

Preferably the frame comprises a grate including longitudinal bars along which the carriage slides to affect said frame-transfer.

Preferably the longitudinal bars are substantially straight, but with a deviated portion, wherein the extent of deviation defines the degree of frame-transfer.

Preferably there is a pair of said frames, one at either side of the bay.

Preferably the frames are biased toward one another.

Preferably the frames include pins projecting through slots in each of the end plates.

Preferably respective tension springs extends from a pin of one frame to an opposite pin of the other frame.

Preferably the deviated portion of each frame has pins extending through the respective end plates and further tension springs extend from those pins to the respective end plates to thereby bias the deviated portion of one frame away from the deviated portion of the other frame.

Preferably there is attached to each frame a heat reflector.

Preferably the heating element of each frame is between the heat reflector and the grate.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

Figure 1:
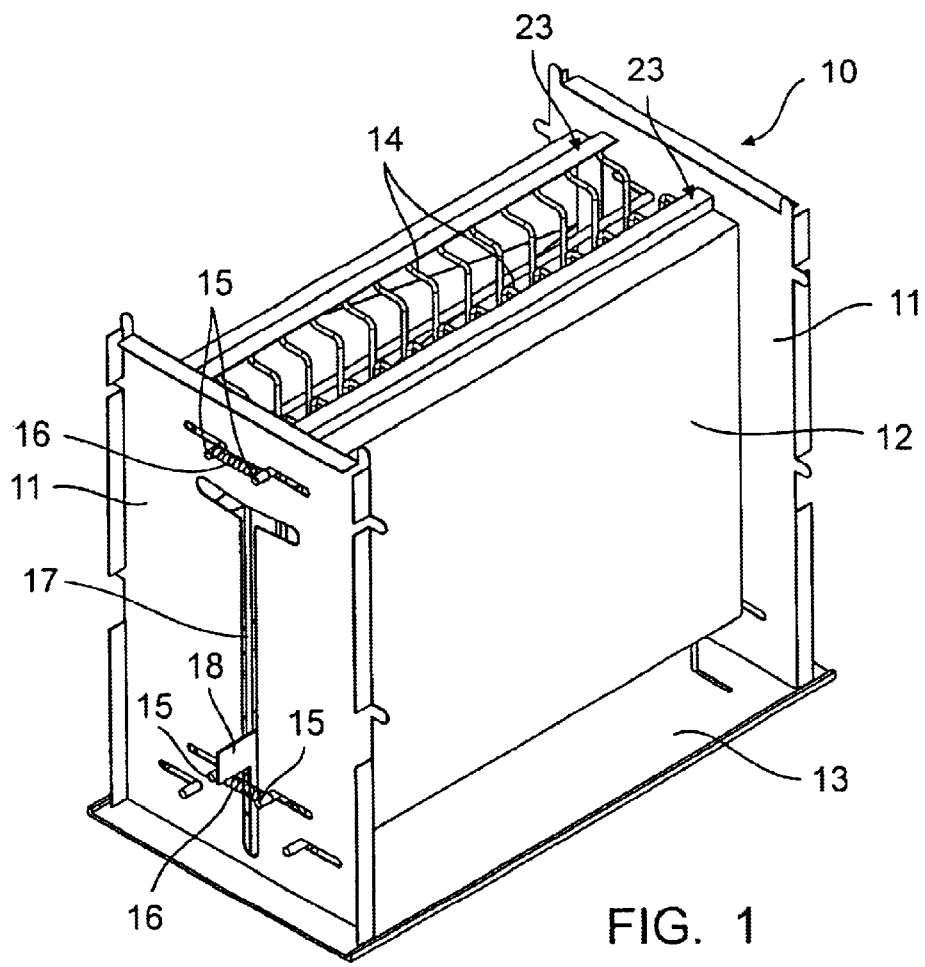
FIG. 1 is a schematic perspective illustration of a toaster chassis.
Figure 2:
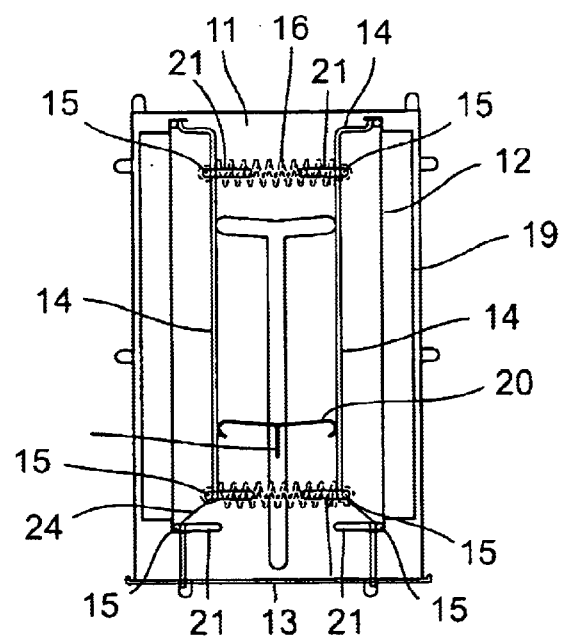
FIG. 2 is a schematic end elevational view of the toaster chassis of FIG. 1.
Figure 3:
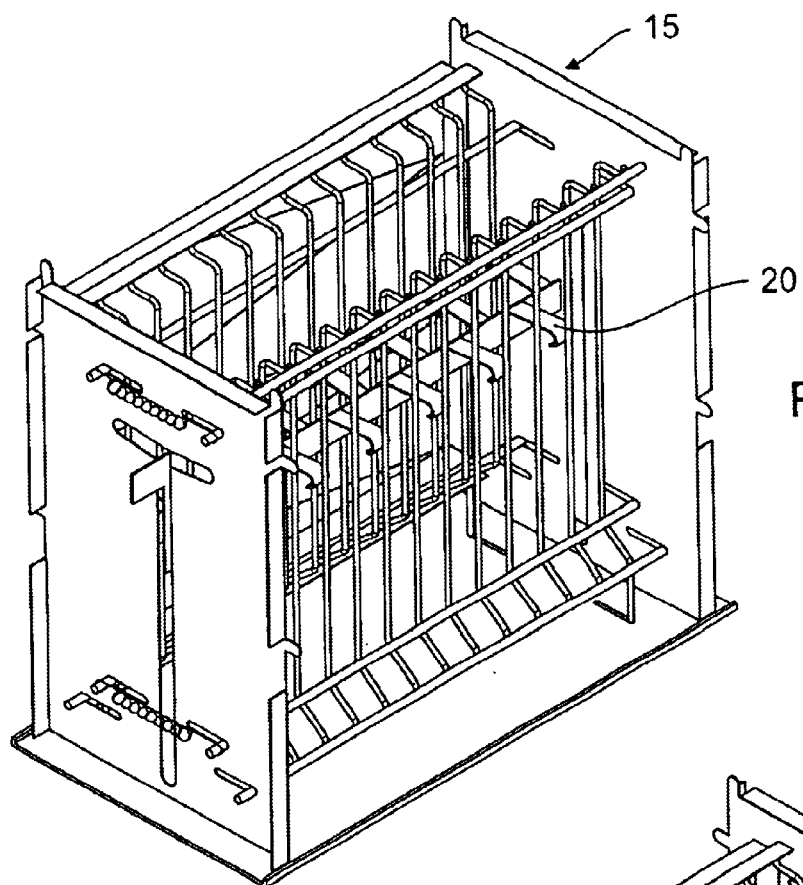
FIG. 3 is a schematic perspective illustration of the chassis of FIG. 1 without its heat shields and with its carriage in a raised receiving/dispensing position.
Figure 4:
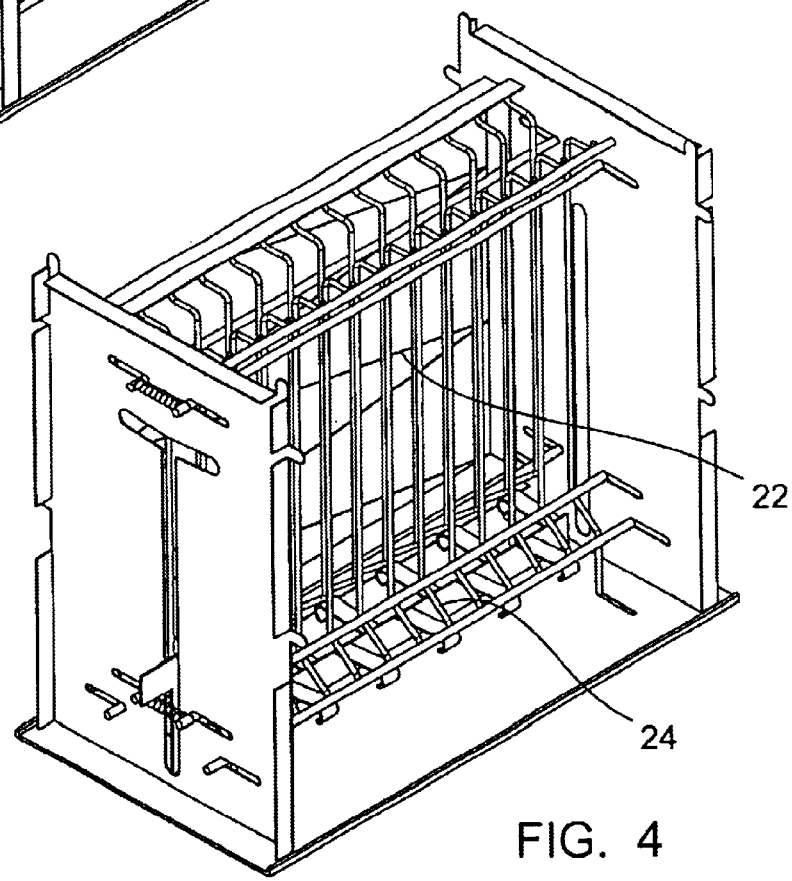
FIG. 4 is a schematic perspective illustration of the toaster showing the heating elements and having its carriage in a lowered, cooking position.
Figure 5:
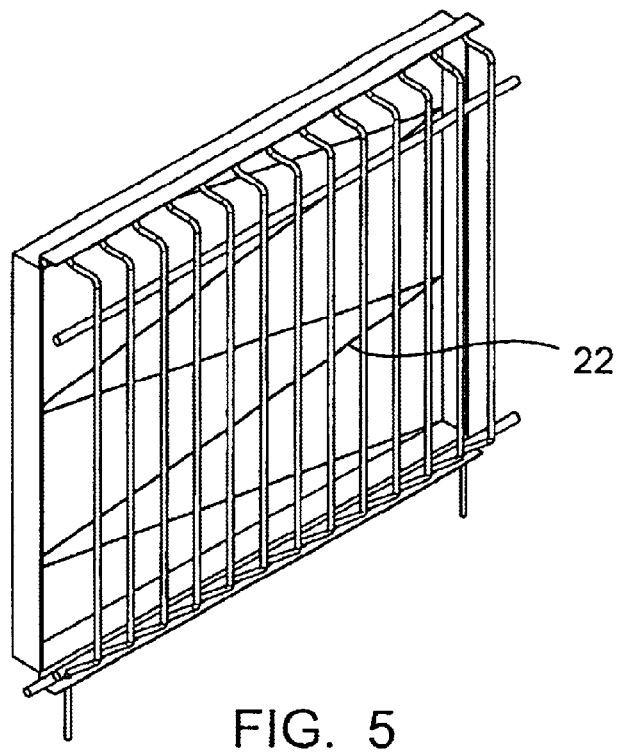
FIG. 5 is a schematic perspective illustration of one frame of the toaster.
Figure 6:
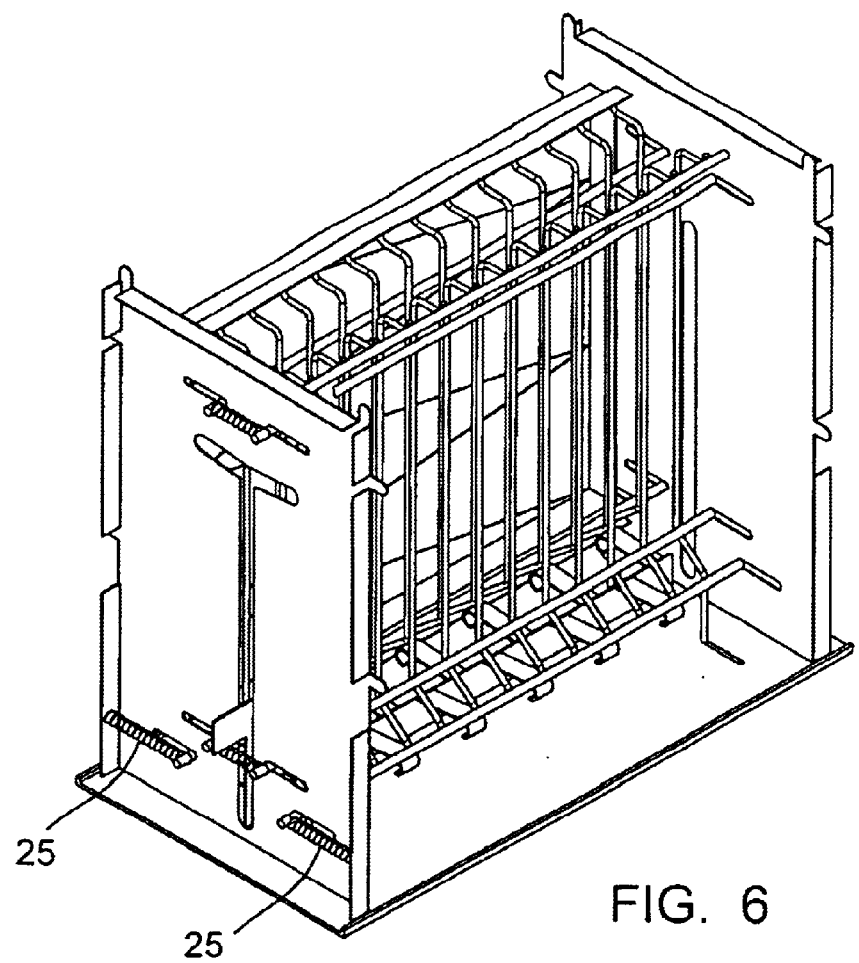
FIG. 6 is a schematic perspective illustration of the toaster chassis showing additional springs attached to a deviated portion its grates.

In the accompanying drawings there is schematically depicted a roaster chassis 10. Chassis 10 comprises a base 13 having a pair of upwardly extending end plates 11. These components are typically fabricated from sheet steel that is preferably galvanised. There is a vertical slot 17 in each end plate through which a carriage arm 18 extends.

Supported by the end plates 11 is a pair of frames 23. Each frame 23 comprises a grate 14, a heating element 22 and a heat reflector 12. The heating element 22 is typically a resistance wire extending back and forth about a mica sheet in between the respective grate and reflector. Alternatively, the heating element might be a quartz heater including a PTC. In the depicted embodiments, each end of the heating wire would be connected to a flexible insulated conductor for current receiving or power take off via a switch or connector (not shown) that is activated by movement of the carriage.

Each grate 14 comprises a number of vertically extending rods welded to a number of horizontally extending rods. The horizontally extending rods terminated with portions acting as pins 15 that extended through horizontal slots 21 in each end plate. Between the upper-most pins 15 there extends a tension spring 16 to bias the upper portions of the respective grates toward one another. Similarly, there is another tension spring 16 between the pins 15 lower down on each of the grates. There are four such springs biasing the frames toward one another. Each vertical rod includes a deviated portion 24 at its bottom end. The deviated portions of the rods of one grate extend away from the deviated portions of the rods of the other grate. There might be compensating tension springs 25 extending from pins 15 at respective ends of a horizontal rod of the deviated portion of each grate to outboard positions of the respective end plates 11. These compensating springs provide a compensatory outward force on the lower part of the frame, in case the force provided by spring 16 is inadequate. As an addition or alternative there can be upper compensating springs at an upper position.

In between each grate there is a receiving bay 19 to receive bread or other food to be toasted or grilled.

There is a carriage 20 from which the carriage arm 18 extends. The carriage 20 has outwardly extending fingers bearing against some of the vertical rods of the grate 14. These fingers counteract the inward bias asserted by the tension springs 16. When the carriage is moved up or down (by hand force applied to a handle attached to the carriage arm 18), the springs 16 maintain a substantially parallel relationship between the two grates. However, when the carriage moves the whole way to the bottom of the slot 17, the fingers encounter the deviated portions 24 of the vertical rods to enable the grates and thereby the heating elements 224 and reflectors 12 to move toward one another. The compensating springs 25 assist in maintaining a parallel relationship between the grates during this movement, in case springs 16 are inadequate.

it should be appreciated that modifications and alterations obvious to those skilled in the art are not to be considered as beyond the scope of the present invention. For example, instead of having two movable frames, there might be one fixed frame and one movable frame. Furthermore, there might be more or fewer springs, and/or the springs might extend to anchor points flanking the chassis. Also, fingers can extend from carriage 20 to bear against vertical rods on different horizontal position or may extend beyond the end panel.

I claim:

1. A cooking appliances comprising:
   a chassis,
   a pair of end plates,
   a frame positioned in between and supported by the end plates,
   a heating element: supported by the frame,
   a receiving bay adjacent the frame, and
   a carriage movable within The receiving bay between a receiving/dispensing position and a cooking position, the carriage interacting with the frame during said movement to transfer the frame and thereby re-locate the heating element with respect to the receiving bay.

2. The appliance of claim 1 wherein the frame comprises a grate including longitudinal bars along which the carriage slides to affect said frame transfer.

3. The appliance of claim 2 wherein the longitudinal bars are substantially straight, but with a deviated portion, wherein the extent of deviation defines the degree of frame-transfer.

4. The appliance of claim 1 comprising a pair of said frames, one at either side of the bay.

5. The appliance of claim 4 wherein the frames are biased toward one another.

6. The appliance of claim 4 wherein the frames include pins projecting through slots in each of the end plates.

7. The appliance of claim 6 further comprising respective tension springs extending from a said Din of one frame to an opposite said pin of the other frame.

8. The appliance of claim 3 wherein the deviated portion of each frame has pins extending through the respective end places and further tension springs extend from those pins to the respective end plates to thereby bias the deviated portion of one frame away from the deviated portion of the other frame.

9. The appliance of claim 4 wherein there is attached to each frame a heat reflector.

10. The appliance of claim 9 wherein the heating element of each frame is between the heat reflector and the grate.

* * * * *